(12) United States Patent
Klitgaard et al.

(10) Patent No.: US 9,909,570 B2
(45) Date of Patent: Mar. 6, 2018

(54) SYSTEM AND METHOD FOR WIND TURBINE SENSOR CALIBRATION

(71) Applicant: LM WP PATENT HOLDING A/S, Kolding (DK)

(72) Inventors: Michael Klitgaard, Odense S (DK); Peter Baek, Jelling (DK); Claus Byskov, Silkeborg (DK)

(73) Assignee: LM WP PATENT HOLDING A/S, Kolding (DK)

( * ) Notice: Subject to any disclaimer, the term of this patent is extended or adjusted under 35 U.S.C. 154(b) by 319 days.

(21) Appl. No.: 14/651,692

(22) PCT Filed: Dec. 11, 2013

(86) PCT No.: PCT/EP2013/076285
§ 371 (c)(1),
(2) Date: Jun. 12, 2015

(87) PCT Pub. No.: WO2014/090903
PCT Pub. Date: Jun. 19, 2014

(65) Prior Publication Data
US 2015/0322925 A1 Nov. 12, 2015

(30) Foreign Application Priority Data
Dec. 14, 2012 (GB) .................................. 1222540.5

(51) Int. Cl.
*F01D 25/00* (2006.01)
*F04D 29/00* (2006.01)
(Continued)

(52) U.S. Cl.
CPC ............. *F03D 17/00* (2016.05); *F03D 7/022* (2013.01); *F05B 2270/33* (2013.01);
(Continued)

(58) Field of Classification Search
CPC .. F03D 17/00; F03D 7/0224; F05B 2270/802; F05B 2270/8041; F05B 2270/33
(Continued)

(56) References Cited

U.S. PATENT DOCUMENTS 4,053,123 A * 10/1977 Chadwick ............. B64C 27/008
244/17.11
7,052,232 B2 * 5/2006 Wobben ................ B64C 27/008
415/118
(Continued)

FOREIGN PATENT DOCUMENTS

EP 2 484 904 A2 8/2012
WO 2009/143849 A2 12/2009
(Continued)

OTHER PUBLICATIONS

International Search Report dated Mar. 27, 2014 in corresponding International Application No. PCT/EP2013/076285.

*Primary Examiner* — Seth W Mackay-Smith
(74) *Attorney, Agent, or Firm* — Nath, Goldberg & Meyer; Jerald L. Meyer; Tanya E. Harkins (57) ABSTRACT

A system and method for the verification and calibration of wind turbine sensor systems is provided. The system comprises an optical capture device provided on a wind turbine which is arranged to record the position of at least one light source provided at the wind turbine during operation of the wind turbine. The motion of the light source relative to the optical capture device can provide an indication of relative motion of a portion of the wind turbine during operation, which can then be used as an input to a calibration and/or a verification system for a sensor system of the wind turbine.

16 Claims, 4 Drawing Sheets

(51) Int. Cl.
*F03D 17/00* (2016.01)
*F03D 7/02* (2006.01)

(52) U.S. Cl.
CPC . *F05B 2270/802* (2013.01); *F05B 2270/8041* (2013.01); *Y02E 10/726* (2013.01)

(58) Field of Classification Search
USPC .......................................................... 416/61
See application file for complete search history.

(56) References Cited

U.S. PATENT DOCUMENTS

| | | | | |
|---|---|---|---|---|
| 7,303,373 B2 * | 12/2007 | Viertl | ...................... | G01B 11/18 415/1 |
| 7,400,054 B2 * | 7/2008 | Wesselink | ............... | F03D 17/00 290/44 |
| 7,883,316 B2 * | 2/2011 | Kildegaard | ............. | F03D 7/042 416/1 |
| 8,131,402 B2 * | 3/2012 | Neumann | ............. | F03D 7/0288 290/44 |
| 8,261,599 B2 * | 9/2012 | Jeffrey | .................... | F03D 13/35 415/1 |
| 8,511,177 B1 * | 8/2013 | Makaremi | ............... | F03D 17/00 73/847 |
| 8,786,117 B2 * | 7/2014 | Winslow | .................... | G01P 5/16 290/44 |
| 2004/0057828 A1 * | 3/2004 | Bosche | ................. | F03D 7/0204 416/1 |
| 2008/0101930 A1 * | 5/2008 | Bosche | ................. | F03D 7/0204 416/31 |
| 2008/0111379 A1 * | 5/2008 | Altemark | ............... | F03D 7/0204 290/44 |
| 2010/0021298 A1 * | 1/2010 | Sandvad | ................. | F03D 7/047 416/1 |
| 2010/0084864 A1 * | 4/2010 | Lucks | ................... | F03D 7/0268 290/44 |
| 2010/0140940 A1 * | 6/2010 | Kammer | ............... | F03D 7/0224 290/44 |
| 2010/0143093 A1 * | 6/2010 | Egedal | ...................... | F03D 7/02 415/4.3 |
| 2011/0074154 A1 * | 3/2011 | Ormel | ...................... | H02P 9/04 290/44 |
| 2011/0103933 A1 * | 5/2011 | Olesen | ................... | F03D 17/00 415/118 |
| 2011/0135466 A1 * | 6/2011 | Latorre | ..................... | F03D 7/02 416/1 |
| 2011/0206511 A1 * | 8/2011 | Frydendal | ............. | F03D 7/0224 416/61 |
| 2011/0243730 A1 | 10/2011 | Eggleston | | |
| 2011/0268569 A1 * | 11/2011 | Loh | ........................ | F03D 7/042 416/1 |
| 2011/0268571 A1 * | 11/2011 | Menke | ................... | G08C 23/04 416/61 |
| 2011/0285129 A1 * | 11/2011 | Li | ............................. | F03D 1/06 290/44 |
| 2012/0128488 A1 * | 5/2012 | Kristoffersen | ........ | F03D 7/0224 416/31 |
| 2012/0219418 A1 * | 8/2012 | Ingerslew | ............... | F03D 7/047 416/1 |
| 2013/0121825 A1 * | 5/2013 | Miranda | ................... | F03D 7/0224 416/1 |

FOREIGN PATENT DOCUMENTS

| | | | |
|---|---|---|---|
| WO | 2009/143850 A2 | 12/2009 | |
| WO | WO 2011157272 A2 * | 12/2011 | ........... F03D 7/0224 |

* cited by examiner

SYSTEM AND METHOD FOR WIND TURBINE SENSOR CALIBRATION

This is a National Phase Application filed under 35 U.S.C. 371 as a national stage of PCT/EP2013/076285, filed Dec. 11, 2013, an application claiming the benefit of United Kingdom Application No. 1222540.5, filed Dec. 14, 2012, the content of each of which is hereby incorporated by reference in its entirety.

FIELD OF THE INVENTION

The present invention relates to a system and method for the calibration and/or verification of a wind turbine sensor system.

BACKGROUND OF THE INVENTION

In modern wind turbine design, a continued drive for increased efficiency and reliability has led to a desire to provide more intelligent solutions for wind turbine control systems. Such solutions often involve the incorporation of wind turbine sensor systems integrated into the turbine design stage. Such systems can produce relatively accurate outputs, as they can be integrated with the manufacture of the wind turbine components, e.g. a blade deflection monitoring system inlaid within the structure of the wind turbine blade itself.

One of the challenges in ensuring accurate operation of such systems is the difficulty in ensuring accurate calibration of the sensor outputs, in particular with regard to accurate positioning of the sensor systems. In addition, it is desirable to be able to effectively verify the output of an integrated sensor system, to ensure that the sensor components are operating correctly.

Some proposed solutions include the use of the Global Positioning System (GPS) in order to accurately calculate the location of the sensor system and/or the wind turbine components. However, such systems are relatively expensive, and can require relatively complicated interpolation and mapping of results in order to successfully calibrate and or verify a turbine sensor system.

It is an object of the invention to provide an improved turbine sensor calibration and/or verification system which provides a relatively simpler and less expensive solution, which can be easily implemented on new or existing wind turbines.

SUMMARY OF THE INVENTION

Accordingly, there is provided a method of calibrating a sensor system for a wind turbine, the wind turbine comprising at least one wind turbine blade, the method comprising the steps of:
  providing an optical capture device towards the nacelle of the wind turbine tower;
  providing at least one light source at a location of the wind turbine distal from said optical capture device;
  for at least a portion of an operational cycle of the wind turbine, recording the position of said at least one light source as viewed by said optical capture device as an indication of the movement of a portion of the wind turbine between said nacelle and the location of said at least one light source; and
  providing said recorded indication of movement as a calibration input to a sensor system of the wind turbine.

The use of a calibration system on a wind turbine allows for an initial accurate calibration of a turbine sensor system, and/or a dynamic or periodic re-calibration of the sensor system, to ensure that such a sensor system provides accurate sensor outputs. Such appropriately calibrated sensor systems can provide for improved wind turbine operation. By an operational cycle of the wind turbine, it will be understood that this can cover initial testing of wind turbine operational performance, e.g. a Full-Load or No-Load test of the turbine, and/or a portion of the normal operational runtime of the wind turbine. The method may further comprise the step of calibrating the sensor system based at least in part on said recorded indication of movement.

Preferably, there is provided a method of calibrating a sensor system for a wind turbine, the wind turbine comprising at least one wind turbine blade, the method comprising the steps of:
  providing at least one tower light source towards the base of a wind turbine tower;
  providing an optical capture device towards the nacelle of the wind turbine tower, said optical capture device arranged to face along said tower in the direction of said at least one tower light source;
  operating the wind turbine in a load state;
  recording the position of said at least one tower light source as viewed by said optical capture device as an indication of tower deflection for the load state; and
  providing said recorded indication of tower deflection for the load state as a calibration input to a sensor system of the wind turbine.

Wind turbine tower bending during turbine operation can result in measurement errors during the operation of a wind turbine sensor system, such as a blade deflection monitoring system. Furthermore, tower bending can influence the calculation of an accurate blade-to-tower clearance distance. Accordingly, the provision of a suitable calibration system to calibrate the operation of a turbine sensor system such as an integrated blade deflection monitoring system results in a more reliable and accurate performance of the sensor system and any associated wind turbine control systems. The use of external optical devices provides a relatively simple and easily verifiable method of calibrating tower bending during load for a wind turbine tower.

The method can also be used as a method of verification of the output of a wind turbine sensor system, by providing a relatively simple and accurate method for verifying the true position of a wind turbine tower and/or a wind turbine blade experiencing deflection, and which can be relatively easily implemented on a wind turbine using straightforward and readily available components.

It will be understood that the apparatus used to implement the method may be temporarily attached to the wind turbine for initial calibration or verification purposes. Alternatively, the apparatus may be permanently attached to the wind turbine, In the case of a permanent apparatus installation, the calibration apparatus may function as a secondary or backup sensor system, which can be used in the event of the main wind turbine sensor system experiencing a failure.

By "load state", it will be understood that the turbine is operated under pre-defined loading conditions, e.g. nominal load or full-load. It will be further understood that the turbine may be operated for a variety of different loads up to maximum load, in order to provide an extensive overview of the relationship between load conditions and tower bending. Such an overview of tower bending for different loading conditions can provide accurate calibration inputs for various turbine sensor systems.

Preferably, the wind turbine sensor system comprises a blade deflection monitoring system, preferably the wind turbine comprises at least one wind turbine blade having an integrated blade deflection monitoring system.

Preferably, the method further comprises the steps of:
providing at least one blade light source towards the tip end of a wind turbine blade of the wind turbine;
as said wind turbine blade passes said tower, recording the position of said at least one blade light source as viewed by said optical capture device as an indication of blade deflection for the load state; and
providing said recorded indication of blade deflection for the load state as a calibration input to a sensor system of the wind turbine.

By monitoring the blade deflection during a measured load condition, a sensor system such as a deflection monitoring system can be accurately calibrated for future turbine operation.

Preferably, the method further comprises the steps of:
operating said wind turbine in no-load or idle state;
recording the position of said at least one tower light source as viewed by said optical capture device as an indication of tower deflection for the no-load state; and
providing said recorded indication of tower deflection for the no-load state as a calibration input to a sensor system of the wind turbine.

Preferably, the method further comprises the steps of:
providing at least one blade light source towards the tip end of a wind turbine blade of the wind turbine;
as said wind turbine blade passes said tower, recording the position of said at least one blade light source as viewed by said optical capture device as an indication of blade deflection for the no-load state; and
providing said recorded indication of blade deflection for the no-load state as a calibration input to a sensor system of the wind turbine.

Monitoring the tower deflection and/or the blade deflection for no-load conditions provides a useful baseline measurement which can be used for accurate calibration of a sensor system such as a deflection monitoring system.

Preferably, the method comprises the step of providing at least one wind turbine blade having an integrated blade deflection monitoring system, preferably a wireless distance measurement system. In a preferred aspect, the wireless distance measurement system is based on a radio communications link between a plurality of communications devices. Preferably, the radio communications link is an ultra-wideband (UWB) communications link.

The use of such wireless distance monitoring systems provides for a high degree of accuracy and reliability during the operation of the deflection monitoring system. As the calibration system is based on an optical detection of position, this provides a second layer of security when initially calibrating the deflection monitoring system, as the calibration operation can be based on two separate measurements of position—the output of the calibration system and the output of the deflection monitoring system itself. It will be understood that the wind turbine blade may comprise an alternate deflection monitoring system, e.g. a fibre-optic deflection monitoring system, and accelerometer-based system, etc.

Preferably, said optical capture device is provided on the wind turbine nacelle, adjacent the wind turbine rotor hub. Preferably, said optical capture device is provided on the underside of the nacelle.

Preferably, said at least one tower light source is provided on the ground adjacent the base of the wind turbine tower.

Preferably, said tower and/or blade light sources are provided as infra-red (IR) lamps.

Preferably, said step of recording is performed for a pre-defined number of rotations of wind turbine rotor blades and/or a pre-defined duration.

In one aspect, the recording is performed once per revolution of the at least one wind turbine rotor blade, wherein the calibration method is continually performed for a turbine sensor system. Preferably, the sensor system comprises at least one accelerometer provided in said at least one wind turbine blade.

In one aspect, the method further comprises the step of dynamically calibrating said turbine sensor system based at least in part on said recorded indication of movement during operation of the wind turbine. This may be continuously performed during turbine operation, or may be a dynamic recalibration of the sensor system during a period of turbine operation, e.g. during a period of high loading.

In an alternative aspect, the recording is performed for a sufficient number of revolutions or for a sufficient duration of time to ensure that a reliable data set has been recorded for calibration or verification purposes.

Preferably, the method comprises after said step of recording, removing said light sources and optical capture devices.

The use of devices and light sources which can be removed from the wind turbine after calibration allows for the devices to be re-used for the calibration of different wind turbines. Additionally or alternatively, the calibration may be performed serially or in parallel for different blades of the wind turbine.

Preferably, the step of providing comprises attaching said optical capture device to an external surface of said nacelle.

Preferably, the step of providing comprises attaching said at least one blade light source to an external surface of the wind turbine blade.

Preferably, said at least one blade light source is releasably attached to the surface of the wind turbine blade.

Preferably, the method comprises the steps of:
providing a predicted movement of a portion of the wind turbine between said nacelle and the location of said at least one light source as output from a sensor system of the wind turbine;
comparing said recorded indication of movement with said predicted movement; and
if the difference between said recorded indication of movement and said predicted movement exceeds a threshold, triggering an alarm state for the wind turbine.

The alarm state may be an actual operator alarm; the generation of a request for a service, inspection or repair of the wind turbine; a deactivation of the wind turbine; and/or a signal to the wind turbine controller to use the output of the calibration system in place of the output of the sensor system, for the purpose of wind turbine control. In this regard, it will be understood that the wind turbine may be provided with a link to a communications network suitable for the transmissions of signals from the wind turbine to a wind turbine operator, which may be in a remote location.

There is also provided an apparatus for calibrating a sensor system for a wind turbine, the apparatus comprising:
an optical capture device for positioning towards the nacelle of the wind turbine tower;
at least one light source for positioning at a location of the wind turbine distal from said optical capture device; and a controller coupled to said first light source and said optical capture device, wherein the controller is operable to implement the method as described above.

Preferably, the apparatus comprises at least one light source for positioning towards the base of a wind turbine tower.

Preferably, the apparatus comprises at least one light source for positioning towards the tip end of at least one wind turbine blade of the wind turbine.

DESCRIPTION OF THE INVENTION

Embodiments of the invention will now be described, by way of example only, with reference to the accompanying drawings, in which.

It will be understood that the attached drawings are illustrative only, and are not provided to scale.

Figure 1:
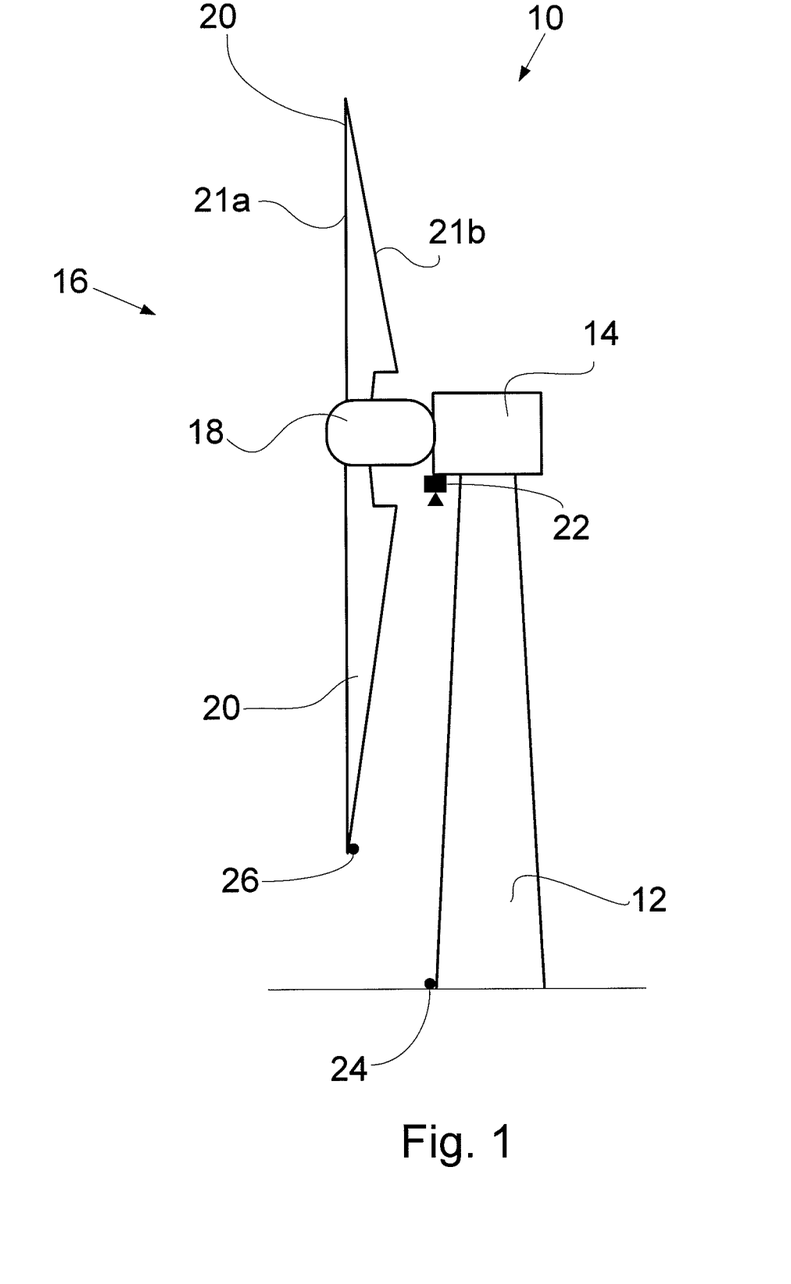
FIG. 1 shows a wind turbine having a calibration and verification system according to the invention.

With reference to FIG. 1, an upwind horizontal axis wind turbine 10 is illustrated according to the so-called "Danish concept". The wind turbine 10 comprises a wind turbine tower 12, a nacelle 14 provided at the top of said tower 12, and a wind turbine rotor 16 rotatably provided on said nacelle 14. The rotor 16 comprises a rotor hub 18 and a plurality of wind turbine blades 20 extending radially from said rotor hub 18. The wind turbine blades 20 are pitchably mounted to the rotor hub 18, such that the blades 20 may be pitched relative to the rotor hub 18, to optimise turbine operation based on operating conditions. The nacelle 14 is rotatably mounted on said tower 12, such that by a yawing action of the nacelle 14 the wind turbine rotor 16 may face the oncoming wind at the turbine 10.

The wind turbine blades 20 comprise an airfoil profile, having a leading edge 21a and a trailing edge 21b. The wind turbine blades 20 follow a generally circular rotational path around the rotor hub 18.

Wind turbine blades are generally formed from fibre-reinforced plastics material, i.e. glass fibres and/or carbon fibres which are arranged in a mould and cured with a resin to form a solid structure. Modern wind turbine blades can often be in excess of 30-40 meters in length, having blade root diameters of several meters.

The wind turbine 10 further comprises at least one turbine sensor system (not shown), which is operable to monitor at least one operational characteristic of the wind turbine 10. Such a turbine sensor system may comprise a wind turbine blade deflection monitoring system, for example a deflection monitoring system based on an ultra wideband (UWB) communication system. An example of such a blade deflection monitoring system can be found in co-pending European Patent Application No. 12180776.2. Other examples of suitable sensor systems include accelerometer-based sensor systems, and/or tower strike prediction systems.

The sensor system may be coupled to a data recording station, wherein turbine operational characteristics can be recorded for subsequent analysis to determine the status and performance of the wind turbine 10. Additionally or alternatively, the output of the sensor system may be coupled to a wind turbine controller (not shown), which is operable to regulate the operation of the wind turbine 10 based on the sensor system output. For example, the controller may be operable to control the pitching of the wind turbine blades 20, in order to adjust the blade pitch angle for improved turbine performance, and/or to prevent the possibility of a tower strike of the blades 20.

In order to ensure accurate operation of the turbine sensor system, the wind turbine 10 further comprises a sensor calibration system which is operable to calibrate and/or verify the output of a wind turbine sensor system. The sensor calibration system comprises an optical capture device 22 which is provided at or near the nacelle 14 of the wind turbine 10. The optical capture device 22 may comprise any suitable camera apparatus. The optical capture device 22 is arranged such that the device 22 faces in a downward direction, from the upper end of the wind turbine tower 12 towards the base of the tower 12. The optical capture device 22 is arranged such that it is located such that the device 22 can capture an image of the base of the tower 12 as well as the lower portion of the rotational path of the wind turbine blades 20. In this regard, the optical capture device 22 is preferably mounted on the nacelle 14, towards the rotor side of the nacelle 14, such that the optical capture device 22 will yaw with the nacelle 14 to always face in the same direction as the rotor 16. Preferably, the optical capture device 22 is mounted on the nacelle 14 between the tower 12 and the rotor hub 18. Alternatively, the optical capture device 22 may be mounted on the tower 12 at the upper end of the tower 12, wherein the optical capture device 22 is operable to rotate around the tower 12 as required.

A first light source 24 is located at or near the base of the wind turbine tower 12. The first light source 24 may comprise a single light source element provided at a specific location at the base of the tower 12, or may comprise an array of light source elements located about the periphery of the tower base, such that at least a portion of the first light source 24 may be seen by the optical capture device 22 for any yaw angle of the nacelle 14 and rotor 16. Alternatively, the first light source 24 may comprise a single light source element rotationally provided at the base of the tower 12, the single light source element arranged to rotate about the tower 12 with the yawing of the nacelle 14, such that the single light source element may be seen by the optical capture device 22 for any yaw angle of the nacelle 14.

A second light source 26 is located towards the tip end of at least one of the wind turbine blades 20. The second light source 26 is preferably provided on a downwind surface of the wind turbine blade 20, preferably on a side of the wind turbine blade 20 facing the tower 12, such that the second light source 26 may be seen by the optical capture device 22 as said wind turbine blade 20 passes through that portion of the rotational path of the wind turbine blades 20 which is viewable by the optical capture device 22.

The light sources 24,26 may be any light source suitable for monitoring by the optical capture device 22. Preferably, the light sources 24,26 comprise infrared (IR) lamps. Preferably, the optical capture device 22 comprises a multi object tracking sensor, which is operable to track the position of the light sources onto a 2D array.

It will be understood that the optical capture device 22 and the first and second light sources 24,26 can be temporarily attached to the wind turbine 10 for the purposes of an initial calibration/verification test, and/or for a periodic calibration/verification test carried out at intervals during the operational lifetime of the wind turbine 10.

Alternatively, the devices 22,24,26 can be permanently affixed to the wind turbine 10, for the purposes of performing a continual or dynamic calibration of sensor systems in the wind turbine 10.

Preferably, the light sources 22,24 are provided in aerodynamically suitable housings, so that the presence of the light sources 22,24, and in particular any light sources provided on the wind turbine blades, does not result in the generation of significant noise levels and does not significantly affect the aerodynamic characteristics of the wind turbine.

In instances where the light sources are provided to be installed for a substantially time period, e.g. as a permanent part of the wind turbine, it will be understood that the wind turbine may be designed to efficiently accommodate the light sources, e.g. the wind turbine blades may be shaped to receive a light source in an aperture or cavity defined in the blade, such that the light source is provided in register with the blade surface. Additionally or alternatively, the light source 26 provided towards the tip of the blade 20 may be coupled to a controller and/or a power supply provided in the wind turbine hub 18 or nacelle 14. Such a remote location of the controller and/or power supply from the blade tip allows for relatively easy servicing of the controller and power supply.

Additionally or alternatively, the light source 26 could be provided by way of an optical fibre or similar light guide which extends through the blade 20 from the blade root end to the location towards the tip. Accordingly, a light source may be provided in a relatively easily serviceable location such as the rotor hub 18 or the nacelle 14, with light from said light source guided from such a location to the location towards the tip it is desired to monitor for movement.

The optical capture device 22 is operable to track the position of the light sources 24,26 onto a 2D array. A suitable controller is then operable to transform the tracked coordinates to determine motion between the optical capture device 22 and the light sources 24,26. Accordingly, by monitoring the position of the first and second light sources 24,26 as seen by the optical capture device 22, several operational characteristics of the wind turbine 10 can be relatively easily determined:

The extent of the bending of the wind turbine tower 12 during wind turbine 10 operation, based on the relative movement between the optical capture device 22, provided at the top of the tower 12, and the first light source 24, provided at the base of the tower 12; and The extent of the deflection of the wind turbine blade 20 to which the second light source 26 is mounted, based on the movement of the second light source 26 as seen by the optical capture device 22.

Figure 2:
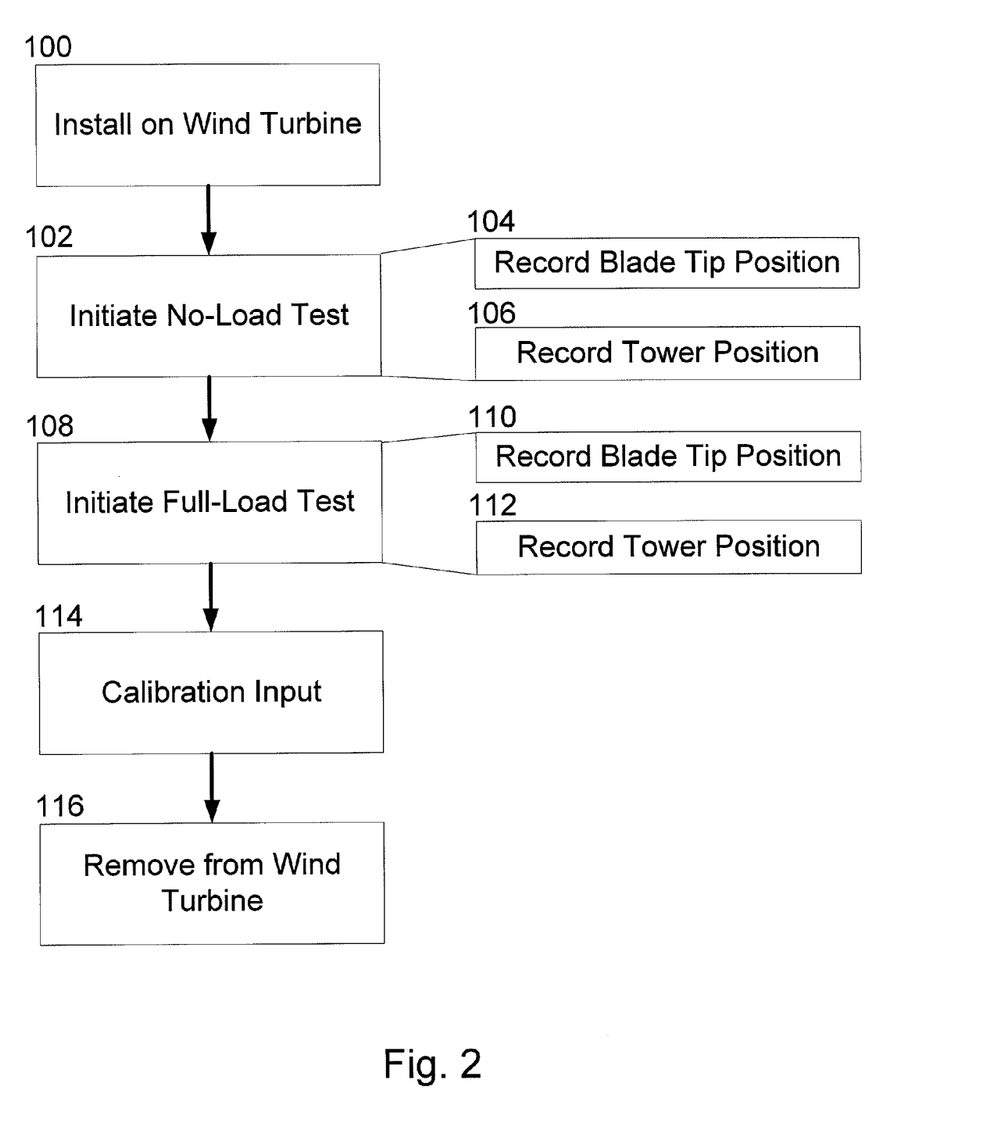
FIG. 2 illustrates the steps of a calibration method according to an aspect of the invention.

These recorded results can then be used for the calibration and/or verification of the outputs of sensor systems provided in the wind turbine 10. It will be understood that these characteristics can be measured for different loading states of the wind turbine 10. With reference to FIG. 2, an outline of the method used for a calibration/verification test according to the invention is illustrated.

Initially (step 100), the optical capture device 22 and the first and second light sources 24,26 are installed on a wind turbine 10, as indicated in FIG. 1. The turbine 10 is then operated for a No-Load Test (step 102), wherein the turbine 10 is operated without an electrical load. The relative movement of the blade tip position and the tower position are recorded for this test (steps 104,106), by recording the relative movement of the first and second light sources 24,26 respectively relative to the optical capture device 22.

Next, a Full-Load Test is performed using the turbine (step 108), wherein the turbine 10 is operated using full electrical load. Again, the relative movement of the blade tip position and the tower position are recorded for this test (steps 110,112), by recording the relative movement of the first and second light sources 24,26 respectively relative to the optical capture device 22.

It will be understood that the turbine 10 may additionally or alternatively be operated for different levels of operational load, in order to record the blade tip and tower positions for different levels of turbine operation.

Once the tower bending and blade deflection has been recorded in the manner, the data can be used as an input to a sensor calibration system (step 114). For example, the data can be used to verify if the output of a position-based blade deflection system is correct (by comparing with the recorded blade tip deflection), or if the accuracy of a tower-strike prediction system is sufficient (by comparing the recorded blade tip deflection and tower deflection to determine likelihood of tower strike).

In a preferred aspect, the calibration system incorporating the devices 22,24,26 can then be removed (step 116) from the wind turbine 10, and used to calibrate other wind turbine installations, but it will be understood that the calibration system may be permanently installed on the turbine 10, to provide for a dynamic or periodic re-calibration of the sensor system components. For example, in the case of an accelerometer-based sensor system, the blade deflection may be recorded for every rotation of the wind turbine rotor 16, or at least for pre-defined rotation intervals. The output of the accelerometer may accordingly be re-centred based on the recorded deflection, the accuracy of the sensor system being continually tuned by the calibration system.

Figure 3:
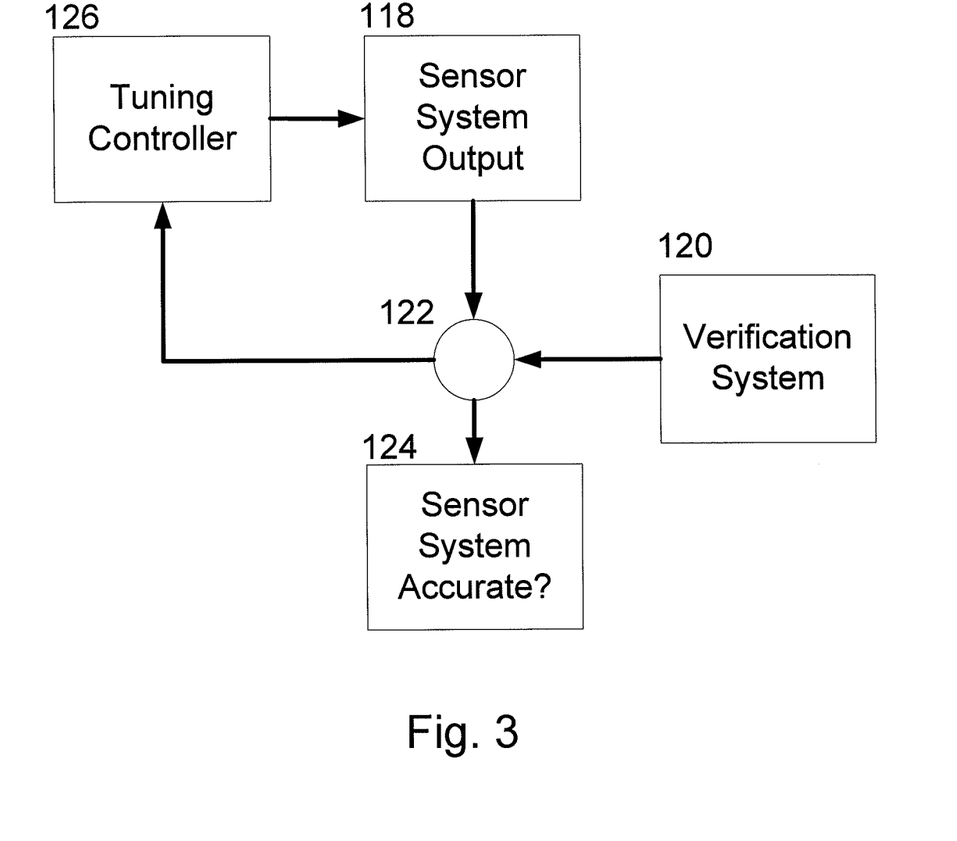
FIG. 3 illustrates a method of verification and tuning of a sensor system according to an aspect of the invention.

With reference to FIG. 3, an example of a calibration method is illustrated.

In FIG. 3, the output of the wind turbine sensor system, e.g. a blade deflection monitoring system, is taken (step 118), and compared with the output from the calibration and verification system of the devices 22,24,26 (step 120). The outputs are then compared (step 122) to judge their accuracy and alignment.

If the output of the calibration system corresponds with the output of the sensor system, it can be judged that the sensor system of the wind turbine 10 is accurately configured (step 124), and the calibration system can be removed for installation on and calibration of another wind turbine sensor system (as in step 116), or the calibration system can be powered off or set to an idle mode until the next calibration and verification test is required.

If the output of the calibration system is different from the output of the sensor system, then the wind turbine controller is operable to tune the sensor system (step 126) to provide an accurate output. It will be understood that any suitable tuning or adjustment of the sensor system may be performed, e.g. appropriate adjustment of gains and/or time constants on a controller of the sensor system, and/or a zeroing of appropriate sensor outputs. Preferably, the controller is operable to tune the sensor system in a feedback look until the output of the sensor system corresponds with the output of the calibration system.

Figure 4:
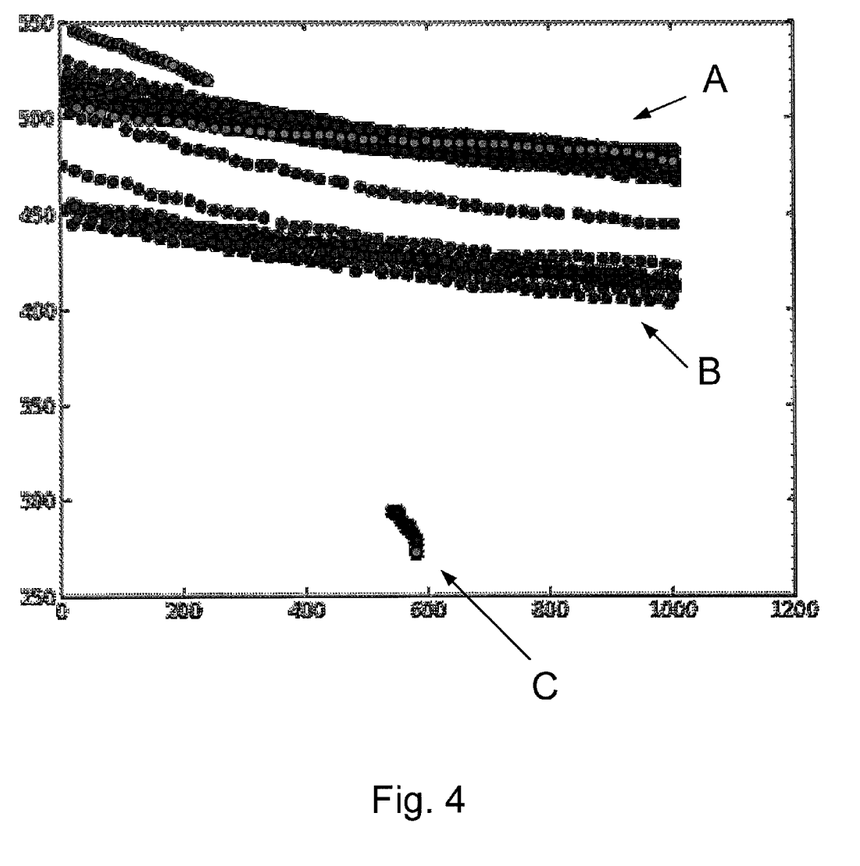
FIG. 4 illustrates an example of data recorded using an embodiment of the system and method of the invention.

FIG. 4 shows an example of data recorded from an embodiment of the system and method of the invention, implemented on a wind turbine.

The plot presented is an array of pixels seen by the optical capture device 22, showing a 2D coordinate plot illustrating the motion of the light sources 24,26 as seen by the optical capture device 22. The scale of the plot as seen by the optical capture device 22 has been adjusted wherein 100 pixels is approximately equal to 4.3 meters.

The array of points passing from the left to the right of the plot illustrate the motion of the blade light source 26 provided towards the tip end of the blade 20, as the blade 20 passes through the field of view of the optical capture device 22. The upper array of points, indicated by A, illustrate the motion of the blade 20 while the turbine is idling or under a No-Load test, i.e. showing minimal deflection of the wind turbine blade 20. The lower array of points, indicated by B, illustrate the motion of the blade 20 during a Full-Load test, showing a deflection of the blade 20 from the No-Load point array.

The cluster of points shown at the lower area of the plot, indicated by C, show the relative motion of the tower light source 24 seen by the optical capture device 22, indicative of the bending of the tower 12 during turbine operation.

Accordingly, the controller is operable to triangulate and transform these recorded results, for use in the calibration and/or verification of a wind turbine sensor system.

As described above, the system is operable to be temporarily installed on a wind turbine, to provide an initial testing and verification of a new wind turbine installation, or for a periodic re-calibration of existing sensor systems. Alternatively, the calibration system may be permanently installed on a wind turbine, operable to perform dynamic re-calibration of the sensor system outputs.

In a further embodiment of the invention where the calibration and verification system is permanently installed on a wind turbine, the system may be operable to generate an alarm when the difference between the output of the calibration system and the output of the sensor system exceeds a pre-defined threshold. Such a relatively large difference in system outputs may be indicative of failure or damage to an aspect of the wind turbine sensor system, and which could require operator repair. In such a case, the calibration system may be operable to perform as a backup or secondary sensor system for the wind turbine, in place of the damaged or failed primary sensor system.

The invention provides a system and method to ensure accurate calibration and verification of the output of a wind turbine blade sensor system. The calibration system may be relatively easily installed on a wind turbine for temporary or permanent calibration and verification. In addition, the calibration system may be operable to monitor the operational status of a wind turbine blade sensor system, and/or to provide a backup sensor system in the event of damage to or failure of the main sensor system of the wind turbine.

The invention is not limited to the embodiments described herein, and may be modified or adapted without departing from the scope of the present invention.

The invention claimed is:

1. A method of calibrating a sensor system for a wind turbine, the wind turbine comprising at least one wind turbine blade, the method comprising the steps of:
   providing an optical capture device towards a nacelle of a wind turbine tower;
   providing at least one light source at a location of the wind turbine distal from said optical capture device;
   for at least a portion of an operational cycle of the wind turbine, recording the position of said at least one light source as viewed by said optical capture device as an indication of the movement of a portion of the wind turbine between said nacelle and the location of said at least one light source; and
   providing said recorded indication of movement as a calibration input to a sensor system of the wind turbine;
   wherein the method comprises after said step of recording, removing said light sources and optical capture devices.

2. The method of claim 1, wherein the method comprises the steps of:
   providing at least one tower light source towards the base of a wind turbine tower;
   providing an optical capture device towards the nacelle of the wind turbine tower, said optical capture device arranged to face along said tower in the direction of said at least one tower light source;
   operating the wind turbine in a load state;
   recording the position of said at least one tower light source as viewed by said optical capture device as an indication of tower deflection for the load state; and
   providing said recorded indication of tower deflection for the load state as a calibration input to a sensor system of the wind turbine.

3. The method of claim 1, wherein the method further comprises the steps of:
   providing at least one blade light source towards the tip end of a wind turbine blade of the wind turbine;
   as said wind turbine blade passes said tower, recording the position of said at least one blade light source as viewed by said optical capture device as an indication of blade deflection for the load state; and
   providing said recorded indication of blade deflection for the load state as a calibration input to a sensor system of the wind turbine.

4. The method of claim 1, wherein the method further comprises the steps of:
   operating said wind turbine in no-load or idle state;
   recording the position of said at least one tower light source as viewed by said optical capture device as an indication of tower deflection for the no-load state; and
   providing said recorded indication of tower deflection for the no-load state as a calibration input to a sensor system of the wind turbine.

5. The method of claim 1, wherein the method further comprises the steps of:
   providing at least one blade light source towards the tip end of a wind turbine blade of the wind turbine;
   as said wind turbine blade passes said tower, recording the position of said at least one blade light source as viewed by said optical capture device as an indication of blade deflection for the no-load state; and
   providing said recorded indication of blade deflection for the no-load state as a calibration input to a sensor system of the wind turbine.

6. The method of claim 1, wherein said optical capture device is provided on the wind turbine nacelle, adjacent the wind turbine rotor hub.

7. The method of claim 1, wherein said at least one light source is provided as at least one tower light source provided on the ground adjacent the base of the wind turbine tower.

8. The method of claim 1, wherein said at least one light source is provided as an infra-red (IR) lamp.

9. The method of claim 1, wherein said step of recording is performed for a pre-defined number of rotations of wind turbine rotor blades and a pre-defined duration.

10. The method of claim 9, wherein said step of recording is performed for a pre-defined number of rotations of wind turbine rotor blades or a pre-defined duration.

11. The method of claim 1, wherein the recording is performed once per revolution of the at least one wind turbine rotor blade, and wherein the method further comprises the step of dynamically calibrating said turbine sensor system based at least in part on said recorded indication of movement during operation of the wind turbine.

12. The method of claim 1, wherein the recording is performed for a pre-defined number of revolutions and for a pre-defined duration of time.

13. The method of claim 12, wherein the recording is performed for a pre-defined number of revolutions or for a pre-defined duration of time.

14. The method of claim 1, wherein the method comprises the steps of:
   providing a predicted movement of a portion of the wind turbine between said nacelle and the location of said at least one light source as output from a sensor system of the wind turbine;
   comparing said recorded indication of movement with said predicted movement; and
   if the difference between said recorded indication of movement and said predicted movement exceeds a threshold, triggering an alarm state for the wind turbine.

15. The method of claim 14, wherein said step of triggering an alarm state for the wind turbine comprises at least one of the following: generating an operator alarm for the wind turbine; generating a request for a service, inspection or repair of the wind turbine; deactivating the wind turbine; signalling to a wind turbine controller to use the output of the calibration system in place of the output of the sensor system for the purpose of wind turbine control.

16. An apparatus for calibrating a sensor system for a wind turbine, the apparatus comprising:
   an optical capture device to be positioned towards the nacelle of the wind turbine tower;
   at least one light source to be positioned at a location of the wind turbine distal from said optical capture device; and
   a controller coupled to said first light source and said optical capture device, wherein the controller is operable to implement the method as claimed in claim 1.

* * * * *